Figure 1:
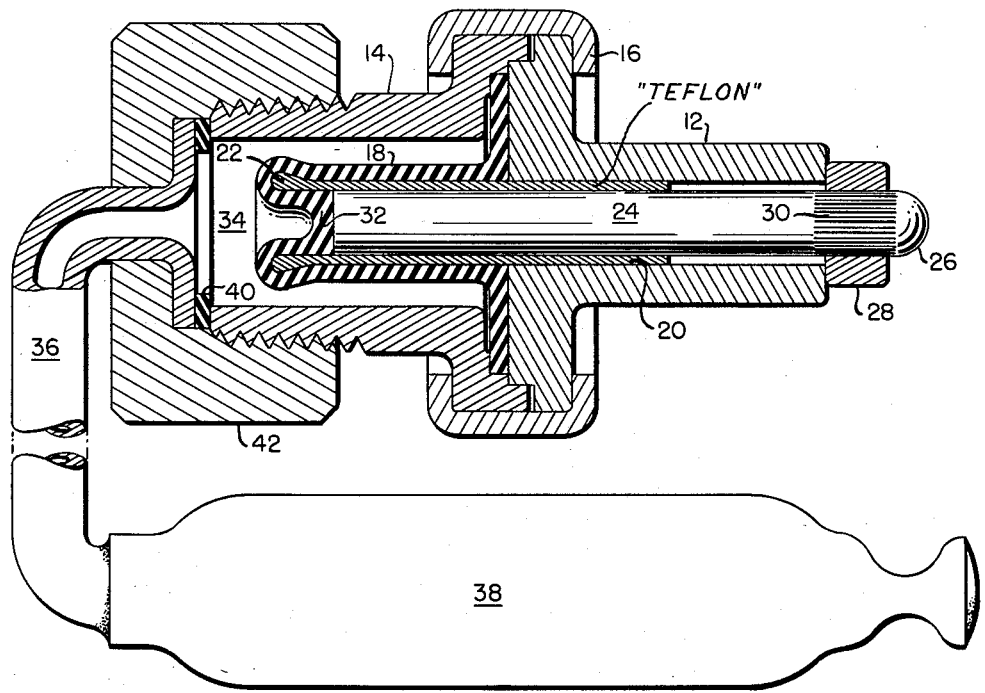

Feb. 19, 1957 W. E. BAKER 2,781,784
ACTUATING DEVICE HAVING GUIDED SUPPORTS WITH A FLEXIBLE MEMBER
Filed June 10, 1953

INVENTOR.
WILLIAM E. BAKER
BY
ATTORNEYS 2,781,784
Patented Feb. 19, 1957

United States Patent Office

2,781,784

ACTUATING DEVICE HAVING GUIDED SUPPORTS WITH A FLEXIBLE MEMBER

William E. Baker, Wellesley, Mass., assignor to Standard-Thomson Corporation, Boston, Mass., a corporation of Delaware Application June 10, 1953, Serial No. 360,740

8 Claims. (Cl. 137—789)

The present invention relates to actuating devices, and more particularly to devices for obtaining displacements in a piston or the like by application of pressure to a flowable transmitting medium.

In the copending application of Woods, Serial No. 271,218, filed February 12, 1952, there is described a device suitable for use in a thermostatic control, comprising a sleeve member or housing, a piston, and a flexible seal or diaphragm having one or more folds enabling the seal to follow the motions of the piston. The seal forms a movable closure for a chamber filled with a pressure transmitting material. The fill may be a liquid, wax, or other thermal material, or it may be any flowable material connected by a tube or capillary with a remote pressure device such as a bulb filled with a thermal material. The present invention relates to improvements in the devices disclosed in said application.

Actuating devices deriving their motion from the volumetric displacement of a thermal fill are ordinarily characterized by a relatively low order of linear displacement for a relatively high order of volumetric variation of the fill. While increasing the volume of the thermal material theoretically provides a means for limiting the temperature change requisite to a given volumetric displacement, it reduces the rate of response of the device to temperature changes. Consequently, it is ordinarily desirable to use as small a quantity of thermal material as possible, and to translate the resulting small volumetric displacement into as large a linear displacement as possible by means capable of withstanding the high pressures which are created. This constitutes the principal object of the present invention.

In addition to the foregoing, there are difficulties arising from the problem of providing a seal for the flowable material which prevents leakage, while permitting displacement with expansion or contraction of the fill. For such purpose a resilient or deformable material or "elastomer," such as rubber or a rubber-like substitute, is well suited. The elastomer has a thin wall exposed on one side to the fill and engaging on the other side with a movable element or piston. But the use of such material is limited by several important factors, among which are its inability to withstand high pressures, the effect of deformation upon its rate of deterioration and consequently upon its useful life, its adhesive tendencies in relation to itself and other materials, which may result in sticking or freezing especially after long periods of storage, and its inherent mechanical limitations in terms of flexibility, frictional resistance to sliding upon itself or other materials, and ability to restore itself to a predetermined shape when projecting without support into a viscous medium under high pressure.

It is accordingly another object of this invention to provide a structure in which the seal of rubber or other elastomer is entirely backed up by rigid means on the side opposite to the fill, at all times and in all positions of the device within its range of operation.

A further object is to provide a structure utilizing the principle of folding or telescoping of the seal member as disclosed in said application, in contrast with ballooning or stretching, as a means for accommodating volumetric displacement.

A still further object is to facilitate the folding or telescoping action and to firmly support and guide the folds to prevent crinkling and insure reliable and consistent response throughout a great many repetitive cycles of the device.

With these and other objects in view, a principal feature of this invention resides in the use of a resilient telescoping or folding diaphragm adapted to bear upon a slidable piston, in combination with a sleeve fitting over the piston and serving as a guide for the folds.

A further feature resides in the shape of the sleeve adjacent to the fold, whereby the sharpness of the fold is decreased by expanding the radius over which the material slides upon an increase in pressure.

A still further and related feature resides in the function of the shape of the sleeve in causing the diaphragm to hold the sleeve securely in the fold at all times to furnish maximum support thereto.

Another feature resides in the function of the sleeve in separating the rubber material on the two sides of the fold, thereby preventing the sides from sticking, especially after long idle periods, as in storage.

Other features of the invention reside in certain features of assembly and construction, modes of operation, structures and arrangements hereinafter described, and more particularly defined in the claims.

Figure 2:
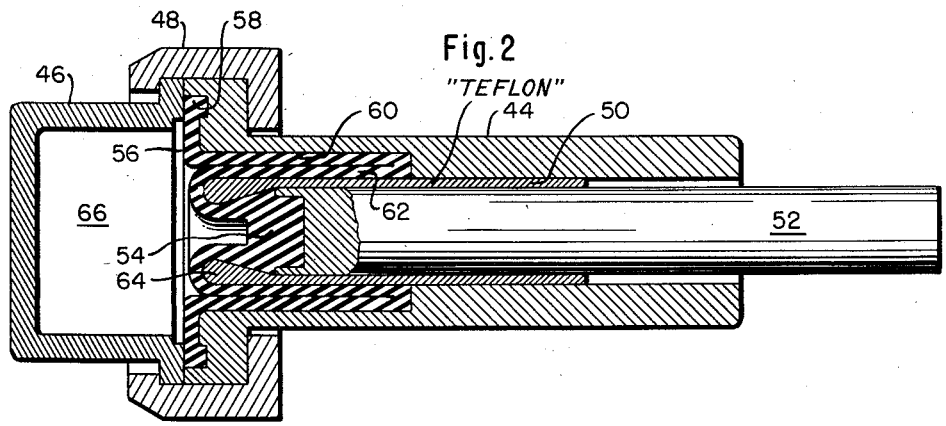

In the drawings, Fig. 1 is an elevation in section of one form of the invention; and Fig. 2 is a similar elevation of a second form of the invention.

Referring to Fig. 1, the device includes a rigid body portion 12 having an internal cylindrical bore and a flanged end portion provided with an annular adapter groove. To this is secured a connector portion 14, which is externally threaded and has a flanged end portion forming an internal shoulder, and an extended cylindrical portion fitting into the aforesaid groove. The parts 12 and 14 are held together by a sealing ring 16 having inturned ends. A flanged portion of the telescoping flexible member 18 lies adjacent to the face of the flanged portion of the body 12 and is held securely at the periphery between the body 12 and connector 14.

A cylindrical sleeve 20 has an outside diameter slightly less than the bore in the body 12 and is slidable therein. In operation, a variable portion of the sleeve extends into the space defined by the connector 14. At the end of this portion the sleeve has an enlarged outside dimension or bead forming a bulge 22, the purpose of which will be more fully described below.

Within the sleeve 20 is a slidable piston 24 having a rounded end portion 26 extending beyond the end of the body 12, but at no time beyond the end of the sleeve having the bulge 22. It is assumed that external means such as a spring, not shown, bear upon the piston in opposition to the pressure. To limit the leftward movement of the piston a collar 28 is firmly pressed over a straight knurled portion 30 of the piston.

The diaphragm or telescoping member 18 has a tubular portion which extends around the sleeve 20 and folds over the bulge 22, terminating in a bearing portion 32 in contact with the piston. As before mentioned, the member 18 is formed of a resilient material preferably a self-lubricating or "bleeding" rubber or a rubber substitute such as the material known under the name "Hycar." It will be especially noted that at all times and in all positions of the device the member 18 is firmly in contact with, and supported against the pressure by, the body 12, sleeve 20 and piston 24. It will be further noted that the telescoping action of the member is unaccompanied by ballooning or stretching other than that stretching which occurrs locally at the fold, and that the folded parts are kept entirely out of contact with one another by the sleeve 20.

The connector 14 forms a pressure chamber 34 which is completely filled with a flowable material such as a liquid or wax. The chamber communicates with a tube or capillary 36, to the end of which is connected a thermal bulb 38 of conventional form. The end of the capillary is flanged and secured to the connector with a suitable gasket 40 by a threaded coupling 42.

The operation of the device is as follows. At nominal pressure the shaft is urged leftwardly as viewed in the figure by external means until the collar 28 abuts against the body 12, the ultimate position being as represented in the drawing. As the pressure is increased the member 18 telescopes inwardly and presses against the piston as it moves. The sleeve 20 determines the curvature and shape of the fold, and moves in the same direction as the piston, but only at half the speed thereof. It will be seen that the bulge 22 provides an enlarged radius for folding of the seal, thereby reducing the stresses both of tension and compression induced locally therein. Also, since the pressure causes the fold to bear against both the inner and outer surfaces of the sleeve in the vicinity of the bulge, the sleeve is effectively locked within the fold. It will be apparent that by this means the fold is firmly pressed against the bulge 22 at every point in order to secure the full advantage of the bulge and to prevent crinkling of the member 18 with consequent reduction in reliability and life.

It will be further noted that during this movement there is sliding between the piston and sleeve and also between the body and sleeve. In addition, there is sliding between the seal and the sleeve, both inside and outside thereof. It is therefore desirable to use for the sleeve a material which offers a minimum of friction and adhesive tendency. In many instances a metallic sleeve is suitable. In others, it is preferable to use an inert plastic material, extruded or machined into the desired shape. A polymer of tetrafluoroethylene known under the name "Teflon" is a suitable example of the latter.

The limit of movement of the piston is determined by, and is roughly equal to, the length of the portion of the member 18 external to the sleeve 22 in its initial position. This is a matter of choice in design. It will be noted that no problem arises with respect to the extent to which the member 18 projects into the chamber 34, since it is in any case firmly and completely supported by the sleeve.

Referring to Fig. 2, another embodiment of the device includes a body portion 44 having an internal annular recess at one end and a connector portion 46 secured thereto by a sealing ring 48 similar to the ring 16 in Fig. 1. Inside the cylindrical bore in the body is a slidable sleeve 50, and inside the sleeve is a piston 52. The piston has a recess at the end to receive the bearing portion 54 of a resilient telescoping member or diaphragm 56. The member 56 is secured at its flanged end in a manner similar to that described with reference to Fig. 1, except that the flange is formed with a thickened end portion 58 entering a groove in the body opposite the bearing surface of the connector 46.

In this embodiment the member 56 has two folds, an outer fold situated in the annular recess in the body, and an inner fold passing over the end of the sleeve. The outermost tubular portion 60 of the member 56, which lies adjacent to the walls of the recess, is not moved during the operation of the device and serves simply as a seal. The adjacent tubular portion 62, which lies adjacent the sleeve, is movable but does not slide upon the portion 60.

It will be noted that the sleeve 50 is formed with an enlarged inside dimension or bead 64 which serves a function similar to that described with reference to the bulge 22 in Fig. 1.

Also, the device is shown in the form of a self-contained thermostatic control unit in which the connector 46 forms a complete closure or chamber 66 with the seal. In this case the fill must be not only flowable but temperature responsive. Many suitable fills are known in the trade, including both liquids and waxes or other materials of relatively high viscosity. It is of course important in any case that the space 66 be entirely filled with material, leaving no voids to absorb a part of the volumetric expansion.

It will be understood that the described embodiments are intended only as illustrative of devices operating according to the invention. For instance the various features of either embodiment may be combined otherwise than as shown, as by combining the sleeve 50 of Fig. 2 with the device of Fig. 1, or by adapting the device of Fig. 2 to the remote control of Fig. 1. Also, various other modifications may be made in design, choice of material, or otherwise, without departing from the spirit or scope of the invention. In addition to variations heretofore suggested, others will occur to persons skilled in this art upon a reading of the foregoing description.

Having thus described the invention, I claim:

1. An actuating device having the combination of a body portion having a cylindrical channel and an annular recess in one end of the channel, a connector portion forming a pressure chamber, a sleeve slidable within the body, an actuating piston slidable within the sleeve, and a flexible member secured to the body and forming a seal for the chamber, said member having a tubular extremity formed with an outer fold lying in the recess, an inner fold passing over the end of the sleeve, and a bearing portion in contact with the piston.

2. An actuating device having the combination of a body portion having a cylindrical channel and an annular recess in one end of the channel, a connector portion forming a pressure chamber, a sleeve slidable within the body, an actuating piston slidable within the sleeve, and a flexible member secured to the body and forming a seal for the chamber, said member having a tubular extremity formed with an outer fold lying in the recess, an inner fold passing over the end of the sleeve, and a bearing portion in contact with the piston, the folds being entirely supported against the pressure by the body, sleeve and piston.

3. An actuating device having the combination of a closure comprised of a body portion and a connector portion forming a pressure chamber, a sleeve slidable within the body, an actuating piston slidable within the sleeve, the end of the piston being within the end of the sleeve, and a flexible member secured to the body and forming a seal for the chamber, said member having a tubular portion surrounding the sleeve, folding over its end and slidably extending along its inner surface and a bearing portion closing said tubular portion and bearing upon the piston.

4. An actuating device having the combination of a closure comprised of a body portion and a connector portion forming a pressure chamber, a sleeve slidable within the body, an actuating piston slidable within the sleeve, the end of the piston being within the end of the sleeve, and a flexible member secured to the body and forming a seal for the chamber, said member having a tubular portion surrounding the sleeve, folding over its end and slidably extending along its inner surface and a bearing portion closing said tubular portion and bearing upon the piston, the flexible member being entirely supported against the chamber pressure by the body, sleeve and piston.

5. An actuating device having the combination of a closure comprised of a body portion and a connector portion forming a pressure chamber, a flowable fill for the chamber, means for varying the pressure in the fill, a sleeve slidable within the body, an actuating piston slidable within the sleeve, the end of the piston being within the end of the sleeve, and a flexible member secured to the body and forming a seal for the chamber, said member having a tubular portion surrounding the sleeve, folding over its end and slidably extending along its inner surface and a bearing portion closing said tubular portion and bearing upon the piston.

6. An actuating device having the combination of a closure comprised of a body portion and a connector portion forming a pressure chamber, a sleeve slidable within the body, an actuating piston slidable within the sleeve, the end of the piston being within the end of the sleeve, a flexible member secured to the body and forming a seal completely enclosing the chamber, and a thermal fill for the chamber, said member having a tubular portion surrounding the sleeve, folding over its end and slidably extending along its inner surface and a bearing portion closing said tubular portion and bearing upon the piston.

7. An actuating device having the combination of a closure comprised of a body portion and a connector portion forming a pressure chamber, a sleeve slidable within the body, an actuating piston slidable within the sleeve, the end of the piston being within the end of the sleeve, and a flexible member secured to the body and forming a seal for the chamber, said member having a tubular portion surrounding the sleeve, folding over its end and slidably extending along its inner surface and a bearing portion closing said tubular portion and bearing upon the piston, said end of the sleeve being rounded to impart an enlarged radius to the fold to reduce the stresses induced in the flexible member.

8. An actuating device having the combination of a closure comprised of a body portion and a connector portion forming a pressure chamber, a sleeve slidable within the body, an actuating piston slidable within the sleeve, the end of the piston being within the end of the sleeve, and an elastic member secured to the body and forming a seal for the chamber, said member having a tubular portion surrounding the sleeve, folding over its end and slidably extending along its inner surface and a bearing portion closing said tubular portion and bearing upon the piston, the walls at the end of the sleeve being thickened to permit the pressure to cause the elastic member to grip the sleeve and retain it in the fold.

References Cited in the file of this patent
UNITED STATES PATENTS

| | | |
|---|---|---|
| 1,819,947 | De Levaud | Aug. 18, 1931 |
| 2,433,221 | Huber | Dec. 23, 1947 |
| 2,587,728 | Hoskins | Mar. 4, 1952 |
| 2,612,419 | Reynolds | Sept. 30, 1952 |
| 2,636,776 | Vernet | Apr. 28, 1953 |
| 2,654,559 | Franck | Oct. 6, 1953 |
| 2,657,711 | Dillman | Nov. 3, 1953 |
| 2,659,565 | Johnson et al. | Nov. 17, 1953 |

OTHER REFERENCES

Teflon-new resin with unusual properties, pages 14–16 of Plastics and Resins, May 1946.